Figure 1:
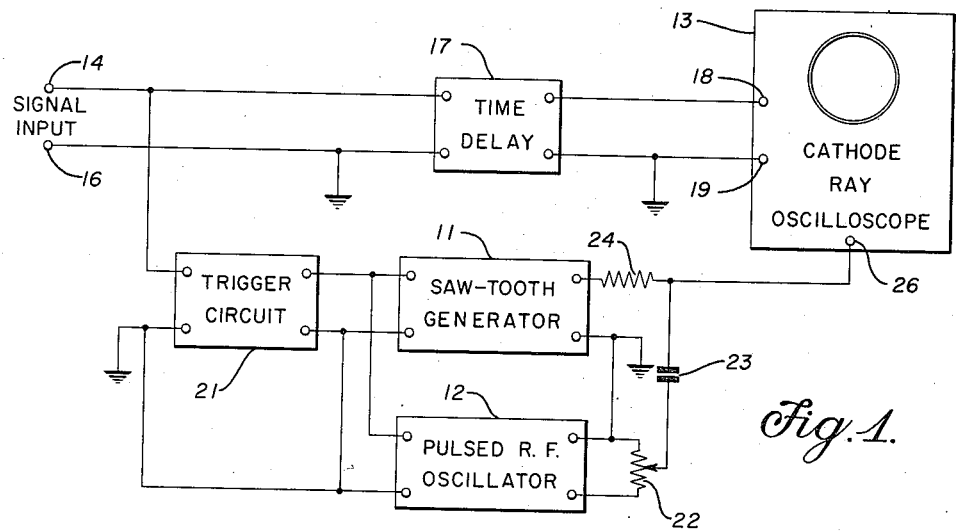

April 22, 1958

H. M. OWREN ET AL 2,832,002

TIME CALIBRATED OSCILLOSCOPE SWEEP

Filed Oct. 17, 1955

INVENTORS.
HARVEY M. OWREN
BYRON M. JOHNSON
VERNON L. SMITH

BY

ATTORNEY.

United States Patent Office 2,832,002
Patented Apr. 22, 1958

2,832,002

TIME CALIBRATED OSCILLOSCOPE SWEEP

Harvey M. Owren, Livermore, Byron M. Johnson, Berkeley, and Vernon L. Smith, Livermore, Calif., assignors to the United States of America as represented by the United States Atomic Energy Commission Application October 17, 1955, Serial No. 541,106

6 Claims. (Cl. 315—26)

The present invention relates to time calibration of oscilloscopic displays of electrical signals and more particularly to means for generating an oscilloscope sweep deflection voltage capable of augmenting a signal display with a directly superimposed time calibration.

Time calibration of signals displayed upon the viewing screen of a cathode ray oscilloscope may be variously achieved by many methods well known within the art. Such methods are generally indirect in that the means employed to calibrate a displayed signal with respect to time is not usually an integral part of said signal, but a supplemental time indication which may be correlated to a particular displayed signal for calibration purposes. More explicitly, with regard to conventional oscilloscopes, equally spaced grid lines are usually provided on the viewing screen of such oscilloscopes for calibrating signals displayed thereon. Certain of the calibrated oscilloscope controls (i. e., sweep frequency, sweep synchronization, horizontal deflection sensitivity, and horizontal deflection linearity controls) may be adjusted such that the spacing between adjacent grid lines corresponds to a known time increment with respect to a displayed signal, thereby resulting in the time calibration thereof. In multibeam oscilloscopes having several separate input signal axes, one input axis may be utilized to display a signal to be observed while another axis may be utilized to display a time recurring signal of constant known time repetition which may be correlated to time events of the signal to be observed. The foregoing calibration methods and various other related conventional methods are disadvantageous because of their indirectness, i. e., it is often tedious or impractical to correlate calibration data to a displayed signal, time base resolution of a displayed signal is limited because of the human factor involved in such calibration methods, and certain other disadvantages and limitations which will become apparent hereinafter.

The sweep deflection voltage generator of the present invention overcomes the aforementioned limitations and disadvantages associated with conventional oscilloscope calibration methods by providing a sweep deflection voltage effective in cooperation with a signal to be displayed to produce a directly superimposed time calibration thereon. More explicitly, the present invention includes generally a generator for developing a linear saw-tooth voltage and a circuit for combining a high frequency sinusoidal voltage of a suitable amplitude and frequency with the saw-tooth voltage to produce a resultant sweep deflection voltage having a wave shape which is substantially linear with respect to time between equal time spaced incremental plateau regions occurring once each cycle of the sinusoidal voltage. The foregoing sweep voltage when applied to the horizontal deflection plates in combination with a signal to be observed applied to the vertical deflection plates of a cathode ray oscilloscope produces an image on the viewing screen which is essentially a display of the signal to be observed with respect to time. Intensified spots, or certain other conspicuous indications corresponding to the equal time spaced plateau regions of said sweep voltage appear superimposed upon said displayed signal, which indications are therefore suitable for direct time calibration purposes.

Accordingly, the sweep voltage generator of the present invention is variously useful in connection with oscilloscopes, oscillographs, and various other signal display or recording apparatus, for directly calibrating signals displayed thereon with respect to time. It is especially useful for calibration service in applications involving the display of very fast rising signals because of the superior time base resolution obtainable with calibration markers superimposed directly upon the displayed signal as opposed to conventional spaced, horizontally disposed calibration markers.

It is therefore an object of the present invention to provide a sweep voltage generator for calibration service in connection with oscilloscopes and the like.

Another object of the present invention is to provide means for directly superimposing equal time spaced markers upon a signal displayed upon an oscilloscope, or the like.

Still another object of the present invention is to provide an improved time base resolution in oscilloscopes and the like.

An important object of the present invention is to provide a time calibrated sweep deflection voltage whereby the need for horizontal deflection calibration of sensitivity in oscilloscopes, and the like, is eliminated.

A further object of the present nvention is to provide a time calibrated sweep deflection voltage whereby the need for horizontal deflection calibration of linearity in oscilloscopes and the like is eliminated.

Figure 2:
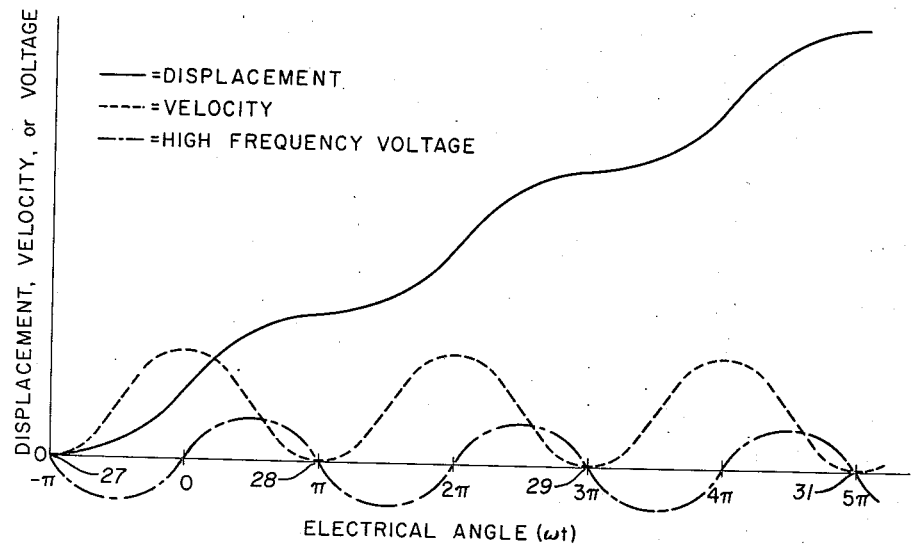
Figure 3:
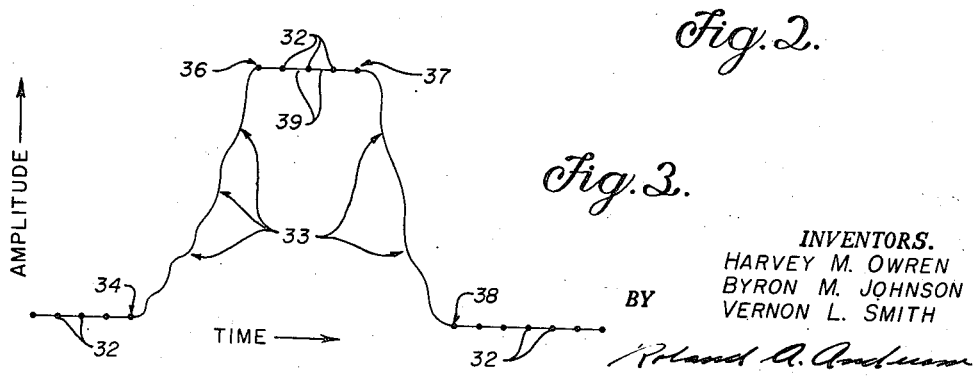

The invention, both as to its organization and method of operation, together with further objects and advantages thereof, will best be understood by reference to the following specification taken in conjunction with the accompanying drawing, of which:

Figure 1 is a block diagram of a preferred embodiment of the invention adapted for time recurring sweep voltage applications;

Figure 2 is a graph of horizontal oscilloscope beam displacement and velocity with respect to several cycles of output voltage from a high frequency pulsed oscillator of the sweep voltage generator of the present invention produced when an oscilloscope is energized with the sweep voltage from said generator; and Figure 3 is a graphical illustration of the image of an input pulse as produced upon the viewing screen of a cathode ray oscilloscope utilizing the sweep voltage output of the present invention, such pulse having very fast rise and fall times with respect to the total time duration of a single sweep.

Referring now to the drawing, the sweep voltage generator of the present invention is seen to comprise generally a circuit for combining the output signal from a conventional linear saw-tooth generator 11 with a repetitious high frequency voltage of suitable amplitude and frequency preferably derived from a sinusoidal oscillator 12.

In the event of the sweep voltage generator of the present invention is utilized to provide the horizontal sweep deflection voltage for a conventional cathode ray oscilloscope 13 in time recurring sweep applications (e. g., for displaying repetitious fast rise time pulses), sinusoidal oscillator 12 is selected to be a pulsed radio frequency oscillator as illustrated in the embodiment of the invention depicted by Fig. 1. As shown therein, conventional terminals 14, 16 provide an input for signals to be displayed upon the viewing screen of oscilloscope 13, the latter terminal 16 being connected to ground.

Terminals 14, 16 are connected through a suitable time delay means 17, such as a pulse delay line, to the Y-axis (vertical) input terminals 18, 19 of the oscilloscope 13.

Terminals 14, 16 are also coupled to the input of a suitable trigger circuit 21 the output of which is commonly connected to the saw-tooth generator 11 and the pulsed oscillator 12. Trigger circuit is to be taken herein as defined in "Electronics," by W. C. Elmore and M. Sands, McGraw-Hill, 1949, page 78, i. e., a circuit which can exist in only one or the other of two stable or quasi stable states and in which the transition from one state to the other takes place in a more or less discontinuous or irreversible manner, and will accordingly include various one shot circuits such as univibrators and one shot blocking oscillators. Time recurring input signals applied to terminals 14, 16 cause output pulses from the trigger generator 21 to be synchronized to the input signal frequency. Consequently such output pulses simultaneously initiate operation of the saw-tooth generator 11 and the pulsed oscillator 12 in synchronism with the time recurring input signals.

The outputs of the saw-tooth generator 11 and the pulsed oscillator 12 are combined by a potentiometer 22 having the fixed terminals connected across the output of said oscillator. The variable terminal of the potentiometer 22 is coupled through an isolating capacitor 23 to one side of a load resistor 24 the other side of which is connected to one output terminal of the saw-tooth generator 11. The other output terminal of the saw-tooth generator 11 and an output terminal of the pulsed oscillator 12 are commonly connected to ground. Consequently the voltage appearing at the juncture of the capacitor 23 and resistor 24 is essentially the sum of a linear saw-tooth voltage wave and a sinusoidal voltage wave. Such combination voltage is utilized to provide a recurring time calibrated horizontal sweep deflection voltage for oscilloscope 13 by connecting the juncture of the capacitor 23 and resistor 24 to the external sweep input terminal 26 of the oscilloscope.

It is often desirable in oscilloscopic work to display singly occurring phenomenon upon the oscilloscope viewing screen for purposes of observation and recording. In the foregoing case, time recurring sweeps may cause phenomenon other than that desired to be displayed and thereby confuse the record. It is therefore advantageous to utilize an appropriately triggered single sweep for displaying such singly occurring phenomenon in which case sinusoidal oscillator 12 need not be pulsed, but may be instead continuous wave (C. W.).

The embodiment of the time recurring sweep voltage generator of the present invention depicted by Fig. 1 is accordingly modified to produce single sweep voltages by employing a C. W. oscillator as sinusoidal oscillator 12 and dispensing with the connections between the input thereof and trigger circuit 21. Oscillator 12 then runs continuously, but its output voltage is of such a small amplitude as to impart a relatively small deflection to the beam of oscilloscope 13. Any singly occurring signal applied to input terminals 14, 16 actuates trigger generator 21 to produce an output pulse. The output pulse initiates operation of saw-tooth generator 11 to produce one cycle of saw-tooth voltage which combines with the free running voltage output of oscillator 12 to produce a single cycle of time calibrated sweep voltage at external sweep input terminal 26 of oscilloscope 13. It is to be noted that synchronism of oscillator 12 with saw-tooth generator 11 and the input signal is not necessary, since only a single cycle of sweep deflection voltage is produced.

Considering now the shape of the resultant sweep deflection voltage applied to terminal 26 of oscilloscope 13, it is to be noted that the voltage increases with respect to time during each cycle of operation according to the general equation:

(1) $$E = E_1 t + E_2 f(t)$$

where:

$E$ = instantaneous resultant sweep voltage
$E_1$ = saw-tooth voltage rise per unit of time
$E_2$ = peak amplitude of a high frequency voltage wave
$t$ = instantaneous time More explicitly, considering the case where $$f(t) = \sin(\omega t + \theta)$$

$\theta$ being an arbitrary phase angle and $\omega$ being the frequency factor (i. e., the output voltage of sinusoidal oscillator 12 in accordance with the embodiment of the invention hereinbefore described) and upon appropriate substitution, Equation 1 becomes:

(2) $$E = E_1 t + E_2 \sin(\omega t + \theta)$$

If amplitude $E_2$ is adjusted to be equal $$\frac{E_1}{\omega}$$

by appropriate manipulation of the variable element of the potentiometer 22 and phase angle $\theta$ is taken as zero, Equation 2 reduces to:

(3) $$E = E_1 t + \frac{E_1}{\omega} \sin \omega t$$

Since the voltage depicted by the foregoing equation is applied to external sweep terminal 26 of oscilloscope 13, the electron beam thereof is proportionately deflected in a horizontal direction. The horizontal displacement of such electron beam may then be expressed by:

(4) $$x = kt + \frac{k}{\omega} \sin \omega t$$

where $k$ is the beam displacement per unit of time which is related to $E_1$ by a constant of proportionality.

An expression for the horizontal velocity of the electron beam is obtained by taking the time derivative $$\frac{dx}{dt}$$

of the displacement expressed by Equation 4 above, therefore:

(5) $$v = \frac{dx}{dt} = k + k \cos \omega t$$

Curves of beam displacement and velocity with respect to several cycles of the high frequency voltage output from pulsed oscillator 12 (i. e., $E_2 \sin \omega t$) are illustrated in Fig. 2. Referring to such figure and considering Equations 4 and 5, it is to be noted that the beam velocity, $v$, is zero for $\omega t$ equal to $\pi$ and odd multiples thereof (i. e., at times when the high frequency voltage wave, $E_2 \sin \pi t$, traverses the zero voltage axis in a negative direction) as indicated at 27, 28, 29, and 31. Since the foregoing conditions occur only at identical relative phase positions once each cycle of the high frequency voltage wave, the horizontal displacement separation between points of zero beam velocity, as between 27 and 28, 28 and 29, 29 and 31, corresponds to increments of time equal to the period of said high frequency voltage, i. e., $$\frac{2\pi}{\omega}$$

Furthermore, when the beam velocity is zero the luminescence effected by said beam impinging the oscilloscope screen is of a relatively greater intensity than that for beam velocities different from zero. Intensified areas or dots are thus disposed in equal spaced relationship along the horizontal sweep trace displayed upon the viewing screen of oscilloscope 13. The separations between adjacent dots are indicative of a known time increment $$\left(\frac{2\pi}{\omega}\right)$$

depending upon the frequency of pulsed oscillator 12.

It is to be noted that when a signal applied to input terminals 14, 16 is impressed at vertical input terminals 18, 19 of oscilloscope 13, after a time delay introduced by time delay means 17, the electron beam experiences vertical components of displacement and velocity in addition to the horizontal components of displacement and velocity due to the hereinbefore described sweep voltage applied to external sweep input terminal 26. Such vertical and horizontal components cooperate in deflecting the electron beam to produce an image of the input signal voltage as a function of time upon the viewing screen of oscilloscope 13. The image is distorted to include markers for direct time calibration, i. e., the aforementioned equal time increment separated intensified spots or other discernable time indications due to the sweep voltage of the present invention.

As an example of the foregoing, consider the case of a pulse having very fast rise and fall times with respect to the total sweep time of saw-tooth generator 11 applied to signal input terminals 14, 16 to produce an image upon the viewing screen of oscilloscope 13, as depicted by Fig. 3. As shown therein, the displayed image is essentially an indication of the input pulse voltage as a function of time distorted to include equally spaced intensified spots or dots 32 at substantially constant valued regions, and sinusoidal like variations 33 at varying regions of the display. The spacing between adjacent dots 32 is indicative of a time increment equal the period $$\left(\frac{2\pi}{\omega}\right)$$

of pulsed oscillator 12. Similarly, the period of each cycle of sinusoidal like variations 33 is equal the period of such oscillator 12. Important time characteristics of the signal pulse may be therefore simply and very accurately determined by direct observation of the displayed image. The rise time of the pulse is determined, for instance, by noting that there are five variations 33 between minimum and maximum voltage values of the pulse during the rising portion thereof, as between 34 and 36, respectively. The rise time is then five times the period of pulsed oscillator 12. Similarly, the fall time of the pulse is three times the period of such oscillator, there being three variations 33 between the maximum and minimum voltage values during the falling portion of the pulse, i. e., between 37 and 38, respectively. The overall pulse width may then be obtained by taking the sum of rise and fall times and the time between points 36 and 37, determined by noting that there are four increments 39 defined by adjacent dots 32 between said points. Overall pulse width is thus twelve periods of oscillator 12.

It is to be noted that the time increment separated intensified spots or sinusoidal like variations (e. g., dots 32 and variations 33) effected by the sweep voltage of the present invention may be made relatively more conspicuous by appropriate adjustment of potentiometer 22. Such potentiometer may be adjusted to increase the amplitude of the radio frequency voltage obtained from sinusoidal oscillator 12 to several times the amplitude value hereinbefore described, i. e., $$\frac{E_1}{\omega}$$

Amplitudes greater than $$\frac{E_1}{\omega}$$

intensify and broaden the intensified spots and increase the amplitudes of the sinusoidal like variations imparted to a signal displayed upon the viewing screen of an oscilloscope by the time calibrated sweep voltage of the present invention. The aforesaid timing indications consequently may be easily made relatively more conspicuous thereby increasing the ease of their observation.

The time base resolution obtainable with the present invention may be varied over a wide range by varying the frequency of pulsed oscillator 12 and correspondingly adjusting potentiometer 22 (i. e., $\omega$ is variable thereby necessitating a corresponding adjustment of amplitude $$\frac{E_1}{\omega}$$

or multiple thereof by potentiometer 22). Increasing the frequency of pulsed oscillator 12 correspondingly increases the number of intensified spots or sinusoidal like variations effected by the present invention upon an oscilloscope display thereby increasing time base resolution. The number of timing indications per sweep practicably obtainable with the present invention is generally between 60 and 70 indications, which is sufficient to provide time base resolutions in the order of one-half of one percent.

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What is claimed is:

1. In a cathode ray oscilloscope sweep circuit comprising a linear saw-tooth voltage generator, a variable amplitude and frequency sinusoidal voltage oscillator connected to the output of said saw-tooth voltage generator to provide a combined voltage output according to the equation $$E = E_1 t + \frac{E_1}{\omega} \sin \omega t$$

where $E_1$ is the linear voltage rise per unit of time of said saw-tooth generator, $\omega$ is the frequency factor of said oscillator, and $t$ is time.

2. A sweep voltage generator adapted to provide calibrated time base deflection voltage comprising a saw-tooth voltage generator producing a voltage characterized by $E_1 t$ where $E_1$ is a constant denoting the linear voltage rise per unit of time, $t$, a sinusoidal voltage oscillator producing a voltage characterized by $E_2 \sin \omega t$ where $E_2$ is a constant denoting peak voltage amplitude and $\omega$ is a constant denoting electrical frequency factor, and output voltage combining means including a voltage amplitude adjuster coupled to said saw-tooth generator and said sinusoidal oscillator to maintain $E_2/E_1$ in a fixed ratio of at least $1/\omega$ and produce a resultant voltage characterized by: $E_1 t + E_2 \sin \omega t$, where $E_2$ is at least $E_1/\omega$.

3. A sweep voltage generator comprising a linear saw-tooth voltage generator producing a voltage characterized by $E_1 t$ where $E_1$ is a constant denoting the linear voltage rise per unit of time, $t$, a variable amplitude and frequency continuous wave sinusoidal oscillator producing a voltage characterized by $E_2 \sin \omega t$ where $E_2$ is a constant denoting peak voltage amplitude and $\omega$ a constant denoting electrical frequency factor, said amplitude $E_2$ adjusted to at least $E_1/\omega$, a trigger circuit coupled to the input of said sawtooth generator, means triggering said trigger generator to thereby actuate said saw-tooth generator, and output means commonly coupled to said saw-tooth generator and said continuous wave oscillator to derive a resultant voltage characterized by the equation: $E = E_1 t + E_2 \sin \omega t$, $E_2/E_1$ being at least $1/\omega$.

4. In a cathode ray oscilloscope including a cathode ray tube having vertical and horizontal deflection plates, said vertical plates coupled to input deflection terminals adapted for connection to a source of singly occurring phenomenon, a sweep voltage generator adapted to provide a single cycle of sweep voltage comprising in combination a linear saw-tooth voltage generator for producing a saw-tooth voltage characterized by $E_1 t$ where $E_1$ is a constant denoting the linear voltage rise per unit of time, $t$, a trigger circuit coupled between said saw-tooth generator and said input deflection terminals to initiate a single cycle of said saw-tooth voltage upon occurrence of said phenomenon, a continuous wave adjustable frequency sinusoidal oscillator for producing a sine wave voltage characterized by $E_2 \sin \omega t$ where $E_2$ is the amplitude and $\omega$ the adjustable electrical frequency factor of said sine wave voltage, means for commonly coupling the outputs of said saw-tooth generator and said continuous wave oscillator to said cathode ray tube horizontal deflection plates to produce thereat a horizontal sweep deflection voltage characterized by the equation: $E = E_1 t + E_2 \sin \omega t$, and amplitude adjustment means coupled to said sinusoidal oscillator for adjusting said amplitude, $E_2$, to at least a value of $E_1/\omega$ whereby the oscilloscopic display of said singly occurring phenomenon is augmented with directly superimposed discernible indications of identical time increment separation equal to $$\frac{1}{\omega}$$

5. A sweep voltage generator adapted to provide calibrated time base deflection voltage comprising a saw-tooth voltage generator producing a saw-tooth voltage having a linearly rising portion characterized by $E_1 t$ where $E_1$ is a constant denoting the linear voltage rise per unit of time, $t$, a variable frequency sinusoidal voltage oscillator producing a sine wave voltage characterized by $E_2 \sin \omega t$ where $E_2$ is a constant denoting peak voltage amplitude and $\omega$ is a constant denoting electrical frequency factor, and a potentiometer having fixed resistance terminals connected across the output of said oscillator and a variable resistance terminal coupled to the output of said saw-tooth generator to produce thereat a resultant voltage characterized by the equation: $E = E_1 t + E_2 \sin \omega t$, said variable resistance terminal adjusted to a value of resistance to render $E_2$ equal to at least $E_1/\omega$.

6. A sweep voltage generator adapted to provide calibrated time base deflection voltage for an oscilloscope having external sweep and vertical deflection terminals comprising a saw-tooth voltage generator to produce upon actuation a saw-tooth voltage having a linearly rising portion characterized by $E_1 t$ where $E_1$ is a constant denoting the linear voltage rise per unit of time, $t$, a pulsed variable radio frequency oscillator to produce upon actuation a sine wave voltage characterized by $E_2 \sin \omega t$ where $E_2$ is a constant denoting peak voltage amplitude and $\omega$ is a constant denoting electrical frequency factor, input signal terminals, time delay means coupled between said input signal terminals and said oscilloscope vertical deflection terminals, a trigger circuit having an input coupled to said signal input terminals and an output commonly coupled to said saw-tooth generator and said pulsed oscillator for actuating same in synchronism with signals applied to said signal input terminals, and a potentiometer having fixed resistance terminals connected across the output of said oscillator and a variable resistance terminal coupled to the output of said saw-tooth generator and to said oscilloscope external sweep deflection terminals to produce thereat a resultant voltage characterized by the equation $E = E_1 t + E_2 \sin \omega t$, said variable resistance terminal being adjusted to fix $E_2/E_1$ in a ratio of at least $1/\omega$.

References Cited in the file of this patent

UNITED STATES PATENTS

| | | |
|---|---|---|
| 1,927,425 | Van Der Mark et al. | Sept. 19, 1933 |
| 2,143,933 | Barthelemy | Jan. 17, 1939 |
| 2,439,321 | Starr | Apr. 6, 1948 |
| 2,466,924 | Bradford | Apr. 12, 1949 |
| 2,673,238 | Druz | Mar. 23, 1954 |
| 2,798,114 | Schlesinger | July 2, 1957 |

OTHER REFERENCES

Steinberg: "Gated Time Markers for CRO Display" Electronics, March 1954, pp. 150 and 151.

Seely: Electron-Tube Circuits, McGraw-Hill, 1950, New York.